United States Patent
Tarocchi et al.

(10) Patent No.: US 12,086,598 B2
(45) Date of Patent: Sep. 10, 2024

(54) FIXED-SIZE POOL STORAGE FOR HANDLING OUT-OF ORDER RECEIPT OF DATA

(71) Applicant: Red Hat, Inc., Raleigh, NC (US)

(72) Inventors: Andrea Tarocchi, Seregno (IT); Francesco Nigro, Milan (IT)

(73) Assignee: Red Hat, Inc., Raleigh, NC (US)

( * ) Notice: Subject to any disclaimer, the term of this patent is extended or adjusted under 35 U.S.C. 154(b) by 226 days.

(21) Appl. No.: 17/401,890

(22) Filed: Aug. 13, 2021

(65) Prior Publication Data

US 2023/0056344 A1 Feb. 23, 2023

(51) Int. Cl.
*G06F 9/52* (2006.01)
*G06F 9/30* (2018.01)
*G06F 9/38* (2018.01)
*G06F 9/50* (2006.01)

(52) U.S. Cl.
CPC ........ *G06F 9/3836* (2013.01); *G06F 9/30152* (2013.01); *G06F 9/505* (2013.01); *G06F 9/5072* (2013.01)

(58) Field of Classification Search
CPC .......... G06F 9/5016; G06F 9/52; G06F 9/505; G06F 9/5072
See application file for complete search history.

(56) References Cited

U.S. PATENT DOCUMENTS

| | | | |
|---|---|---|---|
| 5,249,184 A * | 9/1993 | Woest | H04L 9/40 370/402 |
| 6,460,130 B1 | 10/2002 | Trull et al. | |
| 6,542,987 B1 | 4/2003 | Fischer et al. | |
| 7,047,337 B2 | 5/2006 | Armstrong et al. | |
| 9,171,019 B1 * | 10/2015 | Donlan | G06F 16/2343 |
| 10,740,106 B2 | 8/2020 | Basaba et al. | |
| 10,929,139 B2 | 2/2021 | Hsu et al. | |
| 2004/0243913 A1 * | 12/2004 | Budge | A61B 6/5282 714/776 |
| 2009/0132868 A1 * | 5/2009 | Chkodrov | H04L 51/00 714/E11.187 |
| 2009/0240880 A1 * | 9/2009 | Kawaguchi | G06F 3/067 711/E12.001 |

(Continued)

OTHER PUBLICATIONS

Buzatović, Igor, Confluent, Inc., "Multi-Threaded Message Consumption with the Apache Kafka Consumer" pp. 1-16, Aug. 13, 2020, 16 Pages.

(Continued)

*Primary Examiner* — Jacob Petranek
(74) *Attorney, Agent, or Firm* — Kilpatrick Townsend & Stockton LLP (57) ABSTRACT

The present disclosure provides new and innovative systems and methods for processing out-of-order events. In an example, a computer-implemented method includes obtaining data, committing the obtained data to a fixed-size storage pool, the fixed-size storage pool including a plurality of slots and a pool index including a fixed-length array, by acquiring a slot in the plurality of slots, locking the acquired slot, storing the obtained data in the acquired slot, updating the pool index for the storage pool by updating an element in the array corresponding to the acquired slot, the element storing an indication of the obtained data, and unlocking the acquired slot, and transmitting an indication that the data is available.

20 Claims, 7 Drawing Sheets

(56) References Cited

U.S. PATENT DOCUMENTS

2022/0100876 A1\* 3/2022 Danilov .............. G06F 21/6218

OTHER PUBLICATIONS

Stubbs, Antony, Confluent, Inc., "Introducing the Confluent Parallel Consumer", pp. 1-9, Dec. 15, 2020, 9 Pages.
Aleksandar Prokopec, Oracle Labs, "Cache-Tries: Concurrent Lock-Free Hash Tries with Constant-Time Operations", pp. 137-151, Feb. 24-28, 2018, Vienna, Austria, DOI: 10.1145/3200691.3178498, 16 Pages.

\* cited by examiner

FIXED-SIZE POOL STORAGE FOR HANDLING OUT-OF ORDER RECEIPT OF DATA

BACKGROUND

A computer network includes a set of communication protocols for sharing resources between nodes connected to the network. The nodes can include computers, servers, networking hardware, and the like.

SUMMARY

The present disclosure provides new and innovative systems and methods for processing out-of-order events. In an example, a computer-implemented method includes obtaining data, committing the obtained data to a fixed-size storage pool, the fixed-size storage pool including a plurality of slots and a pool index including a fixed-length array, by acquiring a slot in the plurality of slots, locking the acquired slot, storing the obtained data in the acquired slot, updating the pool index for the storage pool by updating an element in the array corresponding to the acquired slot, the element storing an indication of the obtained data, and unlocking the acquired slot, and transmitting an indication that the data is available.

In an example, an apparatus includes a processor and a memory in communication with the processor and storing instructions that, when executed by the processor, cause the apparatus to obtain data, commit the obtained data to a fixed-size storage pool by acquiring a slot in the fixed-size storage pool, locking the acquired slot, storing the obtained data in the acquired slot, updating a concurrent pool index for the storage pool, the concurrent pool index indicating the acquired slot and an indication of the obtained data, and unlocking the slot, and transmit an indication that the data is available.

In an example, a non-transitory computer readable medium storing instructions that, when executed by one or more processors, cause the one or more processors to perform steps including obtaining a plurality of messages, committing the plurality of messages to a fixed-size storage pool by, for each message acquiring a slot in the fixed-size storage pool, locking the acquired slot, storing the message in the acquired slot, updating a concurrent pool index for the storage pool, wherein the pool index indicates the acquired slot and an indication of the message, and unlocking the slot, and transmitting an indication that the plurality of messages are available.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, wherein.

DETAILED DESCRIPTION

Turning now to the drawings, techniques are disclosed for new and innovative systems and methods for processing out-of-order events. A variety of data used in computer systems can be transmitted, particular via computer networks. Additionally, ordered messages can be used to transmit data between processes (e.g. applications) executing on the same computer system. In several aspects, a data source such as, but not limited to, a database, a representational state transfer (REST) service, a messaging system, and an event streaming platform can provide data as a series of ordered messages. Typical message processing systems utilize a concurrent map to store the messages with a hashed index. The hashed index can be updated to indicate the location of the messages within the concurrent map, which includes performing a variety of hash calculations to update the hashed index and allocating memory to store the messages within the concurrent map.

Systems and methods in accordance with aspects of the disclosure can receive and store messages (e.g. events) received in a random order and provide an indication that data is available once the entire series of ordered messages has been received. The messages can be stored in an event storage structure that provides a storage pool and a pool index. This event storage structure can be computationally efficient, in terms of access time and number of memory allocations, for both storing the incoming messages and providing indications that the messages have been received. The event storage structure can concurrently and efficiently track out-of-order completion events (e.g. the receipt of messages) while keeping bounded the amount of uncompleted events and/or the available capacity to submit new events. In a variety of aspects, the event storage structure has a fixed size. The fixed size can be determined based on an upper bound of the number of messages representing a particular piece of data and/or size of the data. In several aspects, the event storage structure includes a fixed-size storage pool and a concurrent pool index synchronized using acquire/release semantics.

The techniques described herein provide a specific improvement over prior art systems. Existing implementations typically utilize a concurrent map to store data with a hashed index. However, these implementations typically have unconstrained memory usage and high computational overhead due to memory allocations and calculations to establish and maintain the hashed index and concurrent map. The systems and methods described improve the functioning of computer systems by storing and processing data with a lower computational overhead and less memory used than existing solutions. Specifically, the event storage structures described herein can efficiently store data without the computational overhead of memory allocations or hash calculations.

A variety of systems and methods in accordance with aspects of the disclosure are described in more detail below.

Computing Systems

Figure 1:
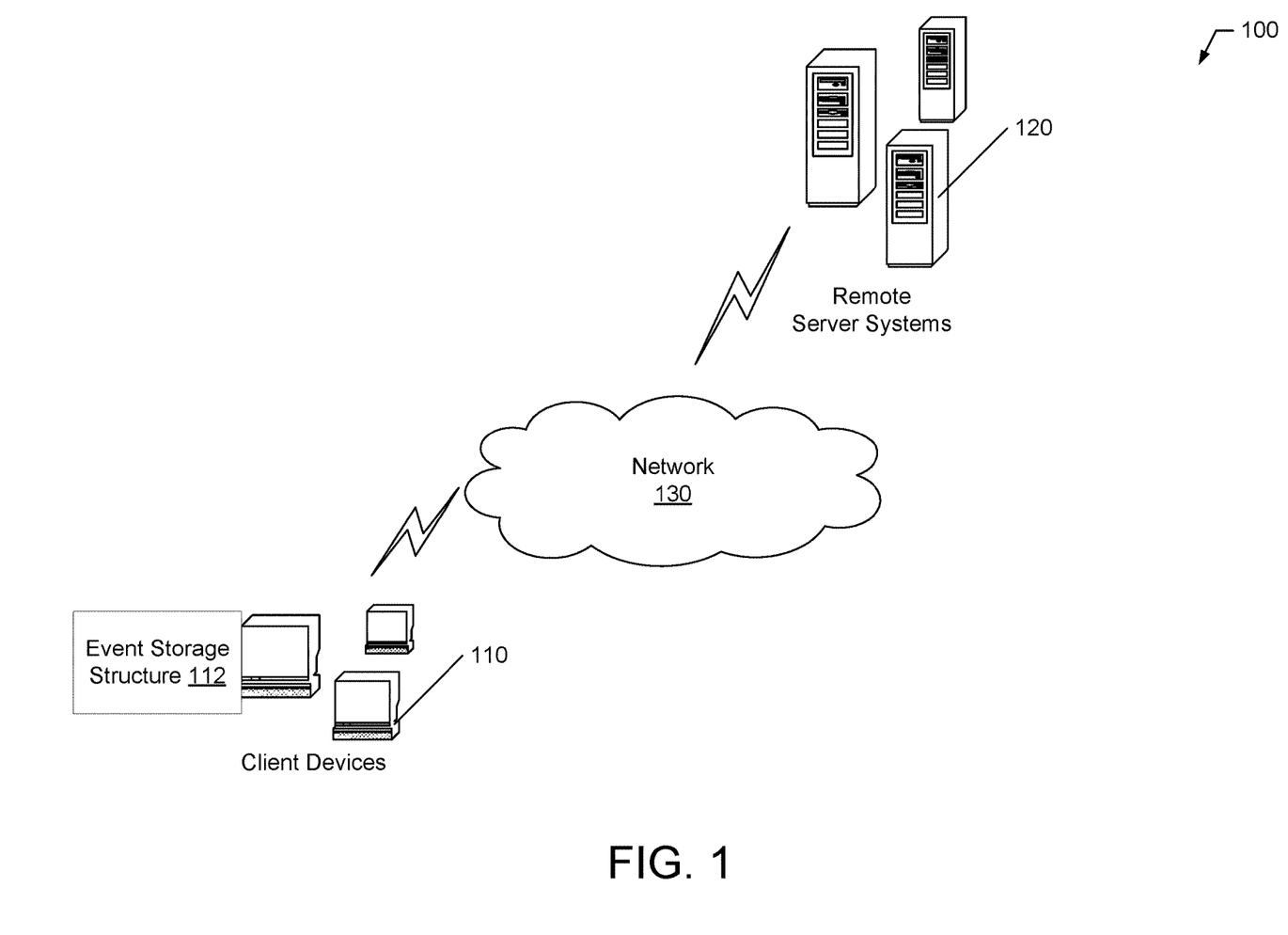
FIG. 1 illustrates a block diagram of a computing system according to an example aspect of the present disclosure.

FIG. 1 illustrates a block diagram of a computing system according to an example aspect of the present disclosure. The computing system 100 can include client devices 110 and/or remote server systems 120 in communication via network 130. In many aspects, the remote server systems 120 are implemented using a single server. In a variety of aspects, the remote server systems 120 are implemented using a plurality of servers. In several aspects, client devices 110 are implemented utilizing the remote server systems 120. In a variety of aspects, remote server systems 120 are implemented using the client device 110.

Figure 2:
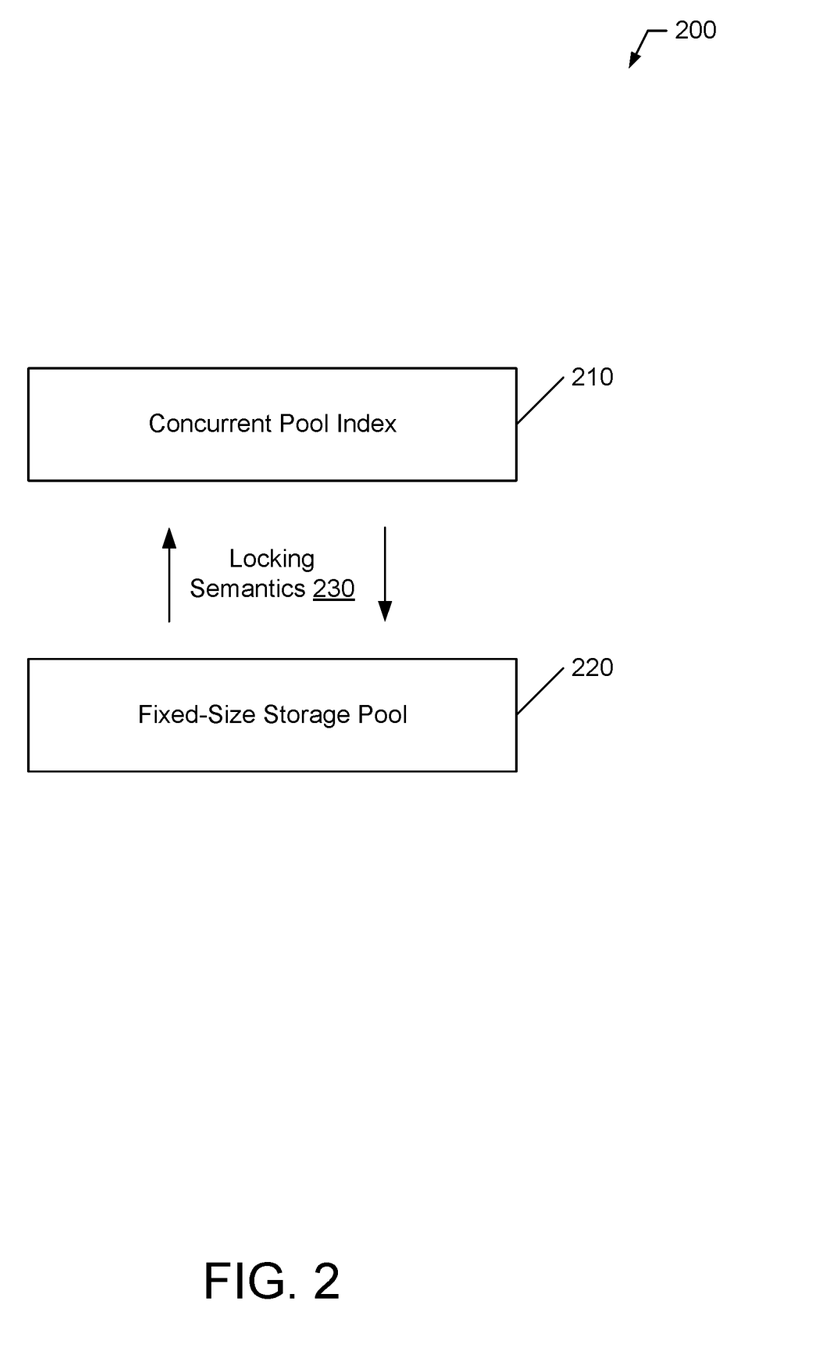
FIG. 2 illustrates an example of an event storage structure according to an example aspect of the present disclosure.

Client devices 110 can obtain data and store the data using a variety of event storage structures 112 as described herein, including those described with respect to FIG. 2. Client devices 110 can also provide data stored using a variety of event storage structures. Remote server systems 120 can provide and/or obtain data as described herein.

Any of the computing devices shown in FIG. 1 (e.g. client devices 110 and remote server systems 120) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 130 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

Event Storage Structures

FIG. 2 illustrates an example of an event storage structure according to an example aspect of the present disclosure. The event storage structure 200 can be used to store data and provide the stored data. The event storage structure 200 includes a concurrent pool index 210, a fixed-size storage pool 220, and locking semantics 230. The concurrent pool index 210 can include one or more indices used to track the resources available in the fixed-size storage pool 220. The indices can include an indication of a corresponding slot in the fixed-size storage pool 220 and/or an indication of the corresponding slot being used or available. The fixed-size storage pool 220 can include one or more slots used to store data that has been received. Each slot in the fixed-size storage pool can include an indication if the slot is currently used (e.g. storing data that has not been processed) or available (e.g. not storing data and/or storing data that has been processed). Processed data can include data that has been retrieved from the event storage structure as described herein, particularly with respect to FIG. 5. The locking semantics 230 can be used to control access to the elements of the concurrent pool index 210 and/or the fixed-size storage pool 220.

In a number of aspects, the concurrent pool index 210 utilizes a data structure such as, but not limited to, a stack, a queue, a circular buffer, a heap, and the like. A queue can be understood as a first-in first-out data structure with two operations (enqueue and dequeue) where enqueue adds an element to the end of a list and dequeue removes and provides the element at the front of the list. A stack can be understood as a first-in last-out data structure with two operations (push and pop), where push adds an element to the front of a list and pop removes and provides the element at the front of the list. In many aspects, the concurrent pool index includes a size function that returns the number of elements stored in the fixed-size storage pool 220.

In several aspects, the fixed-size storage pool 220 utilizes an array data structure. An array data structure can include a collection of elements (e.g. values or variables), where each element can be identified by at least one array index and/or key. The first element in an array can be referred to as the base element and the memory address of the first element can be referred to as the base address. The elements of the array are stored such that the position of each element can be computed based on the base address and the index of the element in the array. Each element in the array can be of the same size and/or varying sizes. In several aspects, the size of an element is determined dynamically based on the size of data to be stored in the element. In a number of aspects, the size of an element is pre-defined.

In a variety of aspects, the locking semantics 230 can be used to prevent race conditions and unintentional corruption of the event storage structure 200. The locking semantics 230 can provide a flag such that, when the flag is marked as locked, a corresponding slot in the fixed-size storage pool cannot be used by another process and when the flag is marked as unlocked, the corresponding slot can be used by another process. In this way, as the event storage structure stores multiple pieces of data in parallel, each storage operation can only operate on a particular slot and a different piece of data cannot be stored in that slot until the slot is marked as unused (via the indication of usage associated with the slot) and unlocked (via the locking semantics 230). The locking semantics 230 can include, but are not limited to, semaphores, mutexes, locks, monitors, and the like.

The event storage structure 200 can provide a variety of operations for storing data, determining the data stored in the event storage structure 200, and providing data stored in the event storage structure 200. A pollData operation can obtain data from a data source, acquire an available slot in the fixed-size storage pool 220 to store the data, to track them and pass the data to be processed. A commit operation can free a slot in the fixed-size storage pool 220 when the data has been processed and/or provide an acknowledgement to the data source that the data processing is finished. In many aspects, pollData and commit execute concurrently (e.g. in parallel). A pendingCommits operation can return the number of data waiting to be acknowledged and/or committed. A lazyInspectPendingCommits operation can inspect the state of each piece of data stored in the event storage structure 200.

A variety of programming languages can be used to implement the event storage structure 200 and its associated operations. The following is pseudocode for various operations for event storage structure 200:

```
PolledData[ ] waitingCommit = new PolledData[CAPACITY]
pollData( ) {
    // do whatever is needed to poll data up to
    // freeSlots.size and store them in a PolledData object
    polledData = fetchData( );
    // acquire an available slot from the freeSlot pool
    Integer claimCheck = freeSlots.borrow( );
    // acquire claimCheck completed
    waitingCommit[claimCheck] = polledData;
    // send data to be processed
    send(polledData, claimCheck);
}
commit(Integer claimCheck) {
    PolledData polledData = waitingCommit[claimCheck];
    // finalize the commit
    polledData.ack( );
    waitingCommit[claimCheck] = null;
    // store release claimCheck
    freeSlots.release(claimCheck);
}
int pendingCommits( ) {
    return CAPACITY - freeSlots.size( );
}
void lazyInspectPendingCommits( ) {
    for (PolledData polledData : waitingCommit) {
        if (polledData != null) {
            // inspect its status
        }
    }
}
```

Although a variety of different event storage structures and operations are shown and described with respect to FIG. 2, it should be noted that event storage structure 200 is provided by way of example only and any data structures and/or operations, including those that utilize different arguments, return different results, and those not explicitly listed herein, can be used in accordance with aspects of the disclosure.

Tracking and Processing Out-of-Order Events

As described herein, a set of messages can be received in a random order but the messages are to be processed in a particular order. An event storage structure can efficiently store the received messages, index the stored messages, and provide notifications when the messages have been received such that they can be processed in order. The event storage structure can include a storage pool and concurrent pool index that operate concurrently and use various locking mechanisms to ensure that the messages are stored, processed, and freed without errors due to race conditions.

Figure 3A:
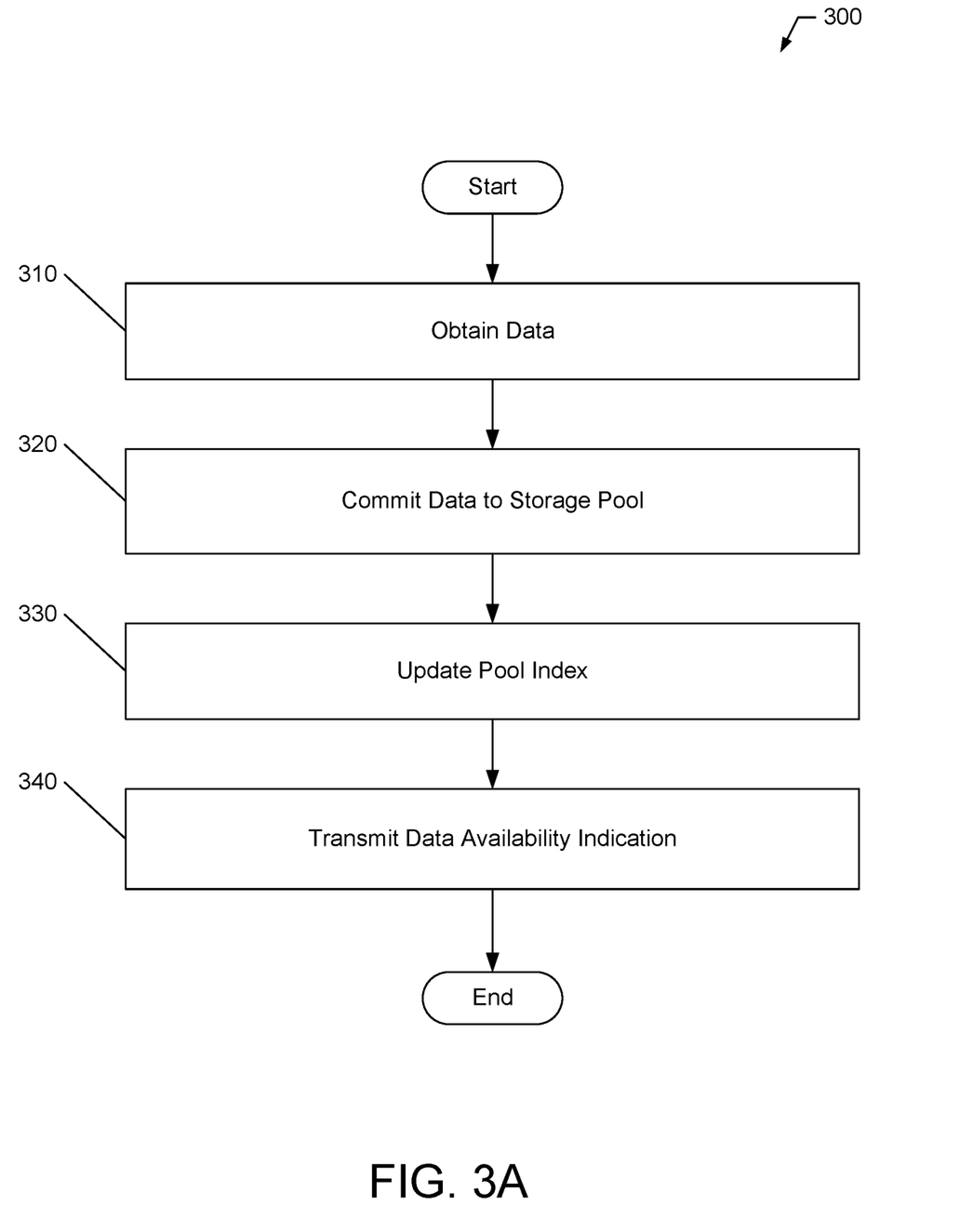
FIGS. 3A-B illustrate flowcharts of a process for processing out-of-order events according to an example aspect of the present disclosure.

FIG. 3A illustrates a flowchart of a process for processing out-of-order events according to an example aspect of the present disclosure. Although the process 300 is described with reference to the flowchart illustrated in FIG. 3A, it will be appreciated that many other methods of performing the acts associated with the process 300 may be used. For example, the order of some of the blocks may be changed, certain blocks may be combined with other blocks, one or more blocks may be repeated, and some of the blocks described are optional. The process 300 may be performed by processing logic that may include hardware (circuitry, dedicated logic, etc.), software, or a combination of both.

Data can be obtained (block 310). The data can include one or more messages representing an ordered set of events as described herein. In several aspects, the messages indicate an ordering such that the obtained data includes a portion of a set of ordered messages. In a number of aspects, the data may be transmitted in portions, and each portion of the data may be transmitted in a separate message via the computer network. These messages can be ordered such that, when the messages are re-assembled in the indicated order, the original data can be reassembled. In many aspects, the messages are part of a stream of data provided by one or more computing systems. For example, the messages can be provided via a variety of message producers, which can be processes and/or computing devices as described herein. The messages can be partitioned into different partitions within different topics. Within a partition, messages can be ordered (e.g. the position of a message within a partition), indexed, and/or timestamped. Message consumers, which can be processes and/or computing devices as described herein, can read the messages from the partitions. In many aspects, data can be divided into a number of packets for transmission over a network. The packets can be received by a network interface card in a random order due to a variety of conditions of the network, such as lag and jitter. The packets can be sequenced such that, when the packets are combined in the order indicated in the sequence, the original data can be reconstructed.

Figure 3B:
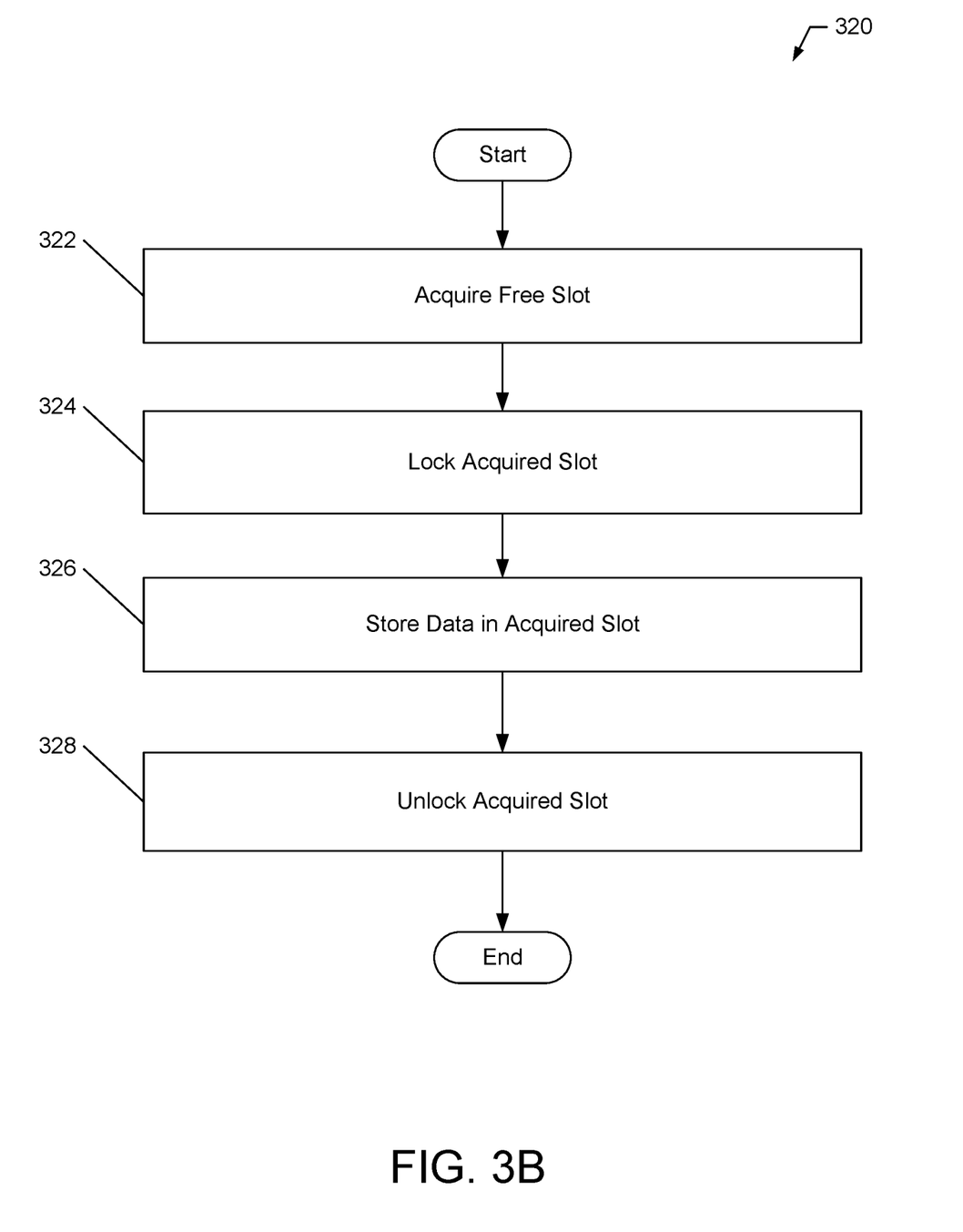

Data can be committed to a storage pool (block 320). The storage pool can be part of an event storage structure as described herein, such as with respect to FIG. 2. Turning now to FIG. 3B, a process for storing data in an event storage structure according to an example aspect of the present disclosure. Although the process 320 is described with reference to the flowchart illustrated in FIG. 3B, it will be appreciated that many other methods of performing the acts associated with the process 320 may be used. For example, the order of some of the blocks may be changed, certain blocks may be combined with other blocks, one or more blocks may be repeated, and some of the blocks described are optional. The process 320 may be performed by processing logic that may include hardware (circuitry, dedicated logic, etc.), software, or a combination of both.

A free slot can be acquired (block 322). The free slot can be a storage slot within a fixed size storage pool of an event storage structure as described herein. The acquired slot can be locked (block 324). The acquired slot can be locked using locking semantics of the event storage structure as described herein. For example, a semaphore for the acquired slot can be set to a locked status. Data can be stored in the acquired slot (block 326). The data can be stored in the acquired slot by writing the data to the acquired slot as described herein. For example, the data can be stored as an element in an array. The acquired slot can be unlocked (block 328). The acquired slot can be unlocked using the locking semantics as described herein. For example, the semaphore for the acquired slot can be set to an unlocked status.

Returning to FIG. 3A, a pool index can be updated (block 330). The pool index can be updated to indicate that a message has been stored in the storage pool. In many aspects, the data includes an identifier and the pool index can be updated to indicate that the data corresponding to the identifier is stored in the storage pool. In this way, the pool index can be used to locate a particular piece of data (e.g. message) within the storage pool. In a number of aspects, the acquired slot is not unlocked until the pool index is updated.

A data availability indication can be transmitted (block 340). The data availability indication can include an acknowledgement that a particular message has been received. The data availability indication can include an identifier of the data that has been stored in the event storage structure. The data availability indication can be provided to a variety of devices and/or processes, such as message consumers and remote computing devices as described herein.

Figure 4:
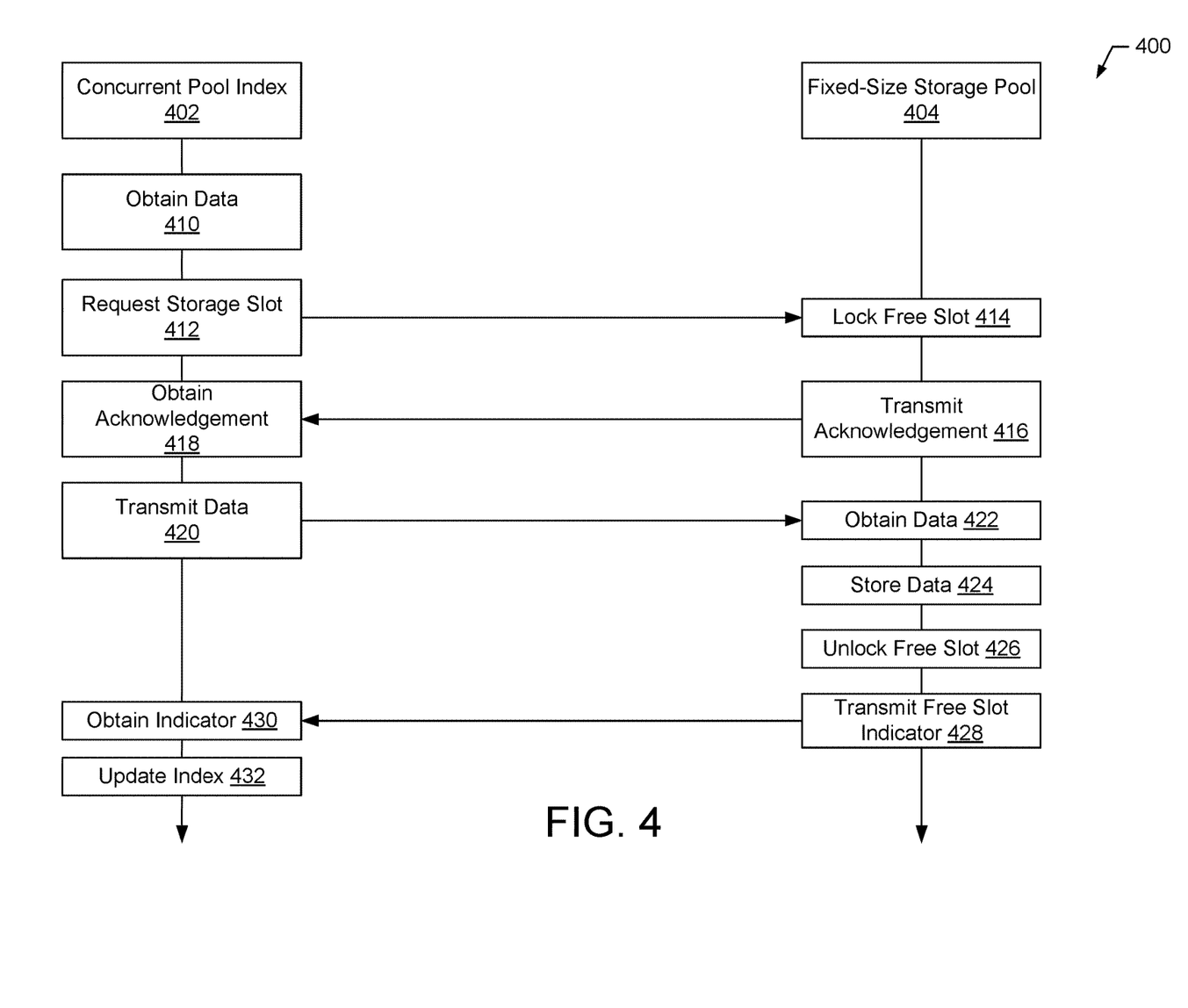
FIG. 4 illustrates a flow diagram of a process for storing data in an event storage structure according to an example aspect of the present disclosure.

FIG. 4 illustrates a flow diagram of a process for storing data in an event storage structure according to an example aspect of the present disclosure. Although the process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. For example, another element than the concurrent pool index (e.g. an event storage structure controller) can obtain data and control the operations of the concurrent pool index 402, fixed-size storage pool 404, locking semantics, and/or any other aspect of the event storage structure as described herein.

A concurrent pool index 402 can obtain data at block 410. The data can include an identifier and/or an indication of the order of the data within a set of ordered events (e.g. messages) as described herein. At block 412, the concurrent pool index can request a storage slot in a fixed-size storage pool 404. At block 414, the fixed-size storage pool 404 can lock a free slot. The free slot can be slot that has been marked as available as described herein. The free slot can be locked using locking semantics of the event storage structure as described herein. At block 416, the fixed-size storage pool 404 can transmit an acknowledgement to the concurrent pool index 402. The acknowledgement can include an indication that a free slot has been allocated to store data. At block 418, the concurrent pool index 402 can obtain the acknowledgement.

At block 420, the concurrent pool index 402 can transmit the data to the fixed-size storage pool 404. At block 422, the fixed-size storage pool 404 can obtain the data. At block 424, the fixed-size storage pool 404 can store the data in the free slot. In many aspects, storing the data in the free slot causes the fixed-size storage pool 404 to mark the free slot as used. In this way, the free slot will not be used to store additional data until the slot is marked as available. At block 426, the fixed-size storage pool 404 can unlock the free slot. The free slot can be unlocked using the locking semantics of the event storage structure as described herein. At block 428, the fixed-size storage pool 404 can transmit an indication of the free slot to the concurrent pool index 402. The indication of the free slot can include an identifier of the slot (e.g. the index of the free slot within an array and the like), an indication of the data stored in the free slot (e.g. the identifier of the obtained data), a timestamp indicating when the data was stored, and/or any other information as appropriate. At block 430, the concurrent pool index 402 can obtain the indication. At block 432, the concurrent pool index 402 can update an index based on the indication. Updating the index can include storing the indication in the concurrent pool index 402 such that the data can be later located based on the identifier of the data and/or the identifier of the free slot. In this way, the concurrent pool index 402 can be used to locate data stored within the fixed-size storage pool in constant time as described herein.

It should be noted that, as shown in process 400, the free slot is unlocked by the fixed-size storage pool 404 at block 426. However, in many aspects, the free slot is not unlocked until block 432 has been completed. In a variety of aspects, the concurrent pool index 402 can perform the actions of block 426 using the locking semantics of the event storage structure. In this way, the free slot is not made available for processing until both the data is stored and the corresponding index is registered in the concurrent pool index.

Figure 5:
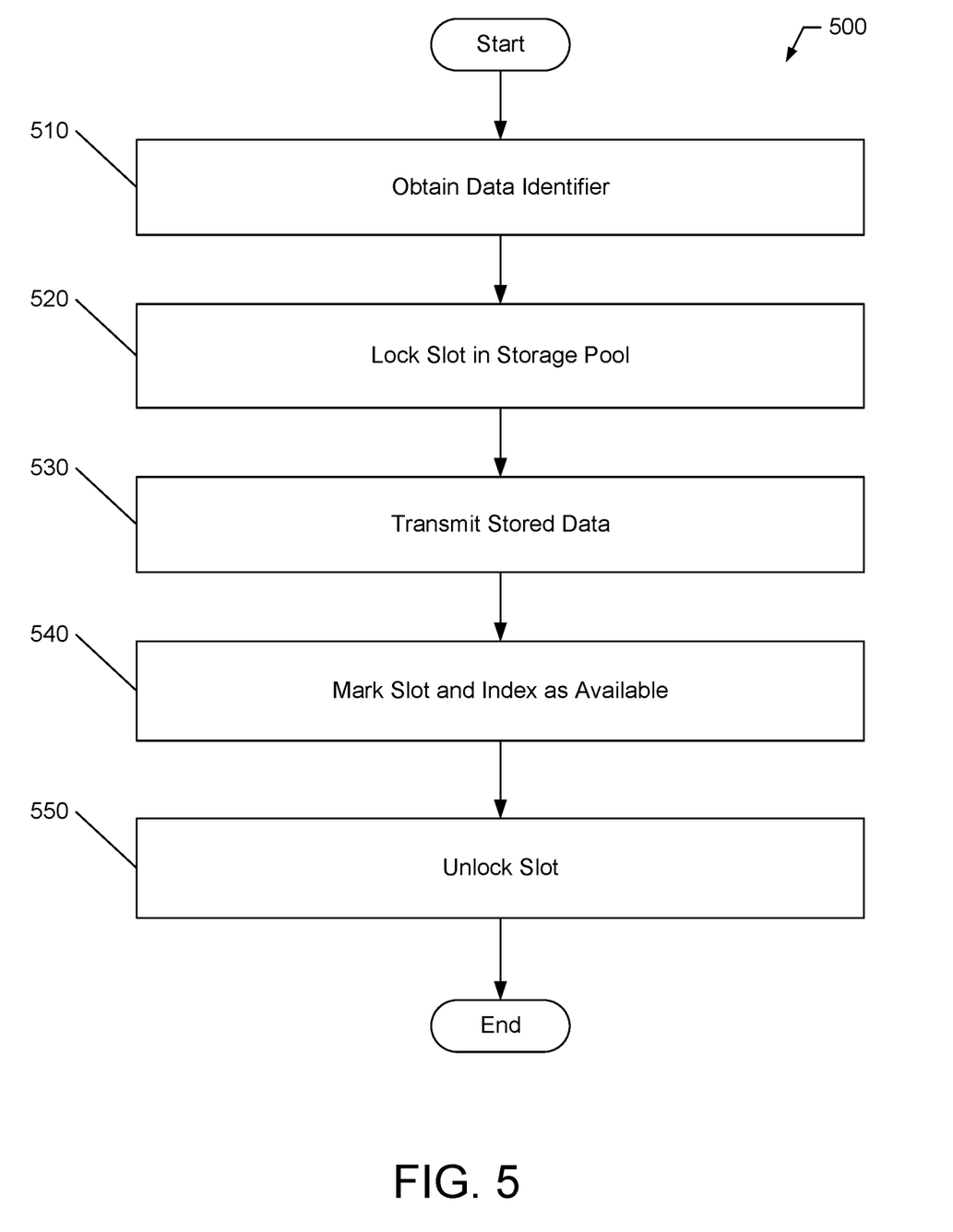
FIG. 5 illustrates a flowchart of a process for providing data according to an example aspect of the present disclosure.

FIG. 5 illustrates a flowchart of a process for providing data according to an example aspect of the present disclosure. Although the process 500 is described with reference to the flowchart illustrated in FIG. 5, it will be appreciated that many other methods of performing the acts associated with the process 500 may be used. For example, the order of some of the blocks may be changed, certain blocks may be combined with other blocks, one or more blocks may be repeated, and some of the blocks described are optional. The process 500 may be performed by processing logic that may include hardware (circuitry, dedicated logic, etc.), software, or a combination of both.

A data identifier can be obtained (block 510). The data identifier can indicate a slot in a storage pool, an identifier of a piece of data, an index of a message within a set of ordered messages, a timestamp, and/or any other item that can be used to index and identify a piece of data within a concurrent pool index as described herein.

A slot in a storage pool can be locked (block 520). The slot can be the slot located in the storage pool based on querying the concurrent pool index using the data identifier as described herein. The slot can be locked using the locking semantics of the event storage structure as described herein. In several aspects, the index identifying the slot and/or the data can be locked using the locking semantics.

Stored data can be transmitted (block 530). The stored data can be transmitted to a computing device and/or process requesting the data. In many aspects, the computing device and/or process requesting the data also provides the obtained data identifier. For example, the computing device and/or process can include a message consumer that is retrieving a set of ordered messages generated by a message producer and/or obtaining data transmitted via a network connection as described herein.

The slot and index can be marked as available (block 540). The slot and/or index can be marked as available based on the stored data being transmitted. By marking the slot and/or index as available, the slot and/or index can be used to store additional data in the future as described here.

The slot can be unlocked (block 550). The slot can be unlocked using the locking semantics as described herein. In several aspects, the index identifying the slot and/or the data can be unlocked using the locking semantics.

Figure 6:
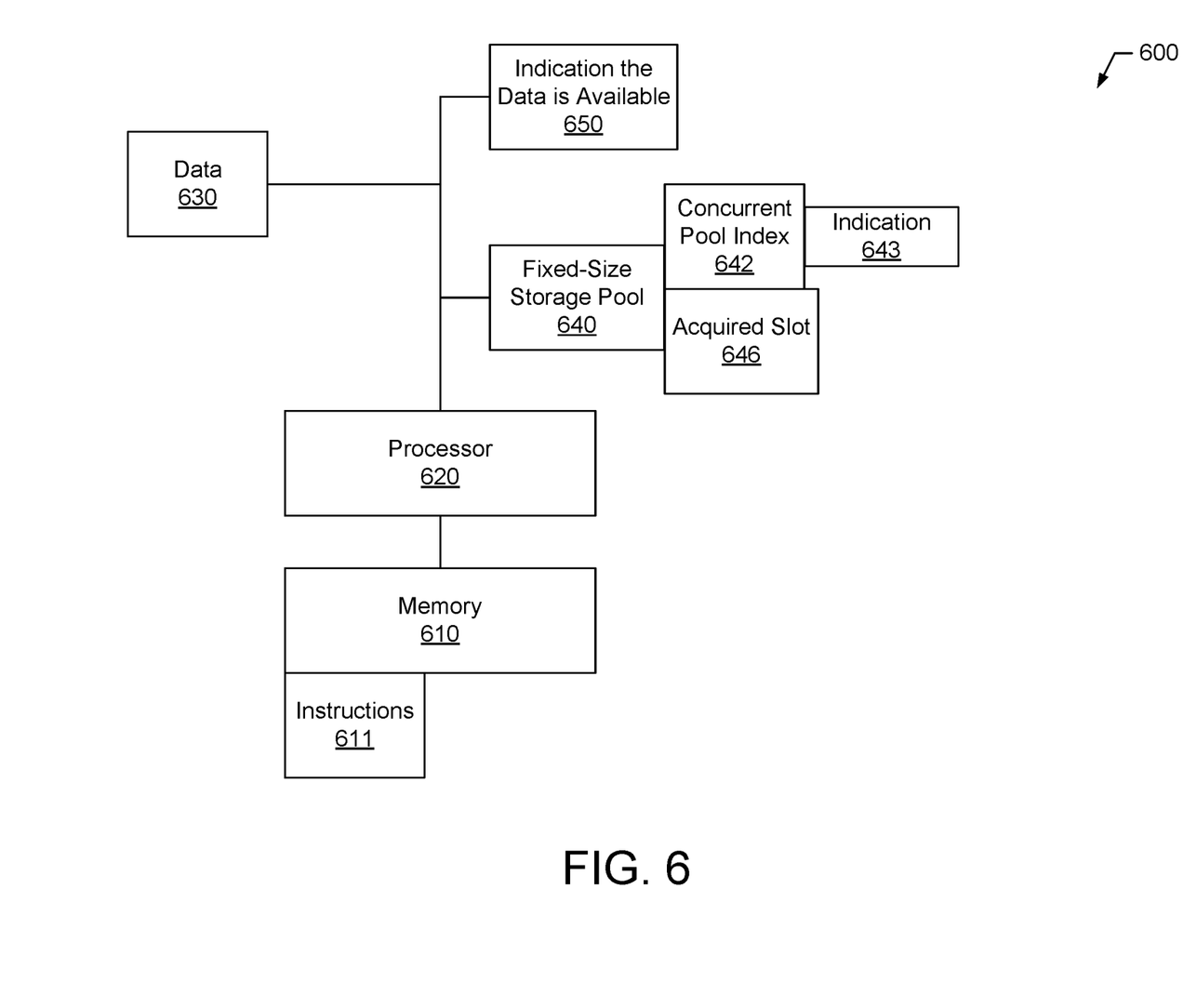
FIG. 6 illustrates a block diagram of an apparatus according to an example aspect of the present disclosure.

FIG. 6 illustrates a block diagram of an apparatus according to an example aspect of the present disclosure. The system 600 includes a memory 610 and a processor 620 in communication with the memory 610. The memory 610 can store instructions 611 that, when executed by the processor 620, cause the system to perform a variety of processes as described herein. The instructions 611 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The processor 620 can obtain data 630 as described herein. In a variety of aspects, the data 630 is a set of ordered messages that can be received in a random order. The processor 620 can store the data 630 in the fixed size storage pool 640 as described herein. For example, the processor 620 can, for a particular message in the data 630, acquire a slot 646 in the fixed size storage pool 640 and update concurrent pool index 642 with an indication 643 of the location of the message within the fixed-size storage pool 640 (e.g. acquired slot 646) and an indication of the stored message (e.g. an identifier of the message and/or the index of the message within the ordered set of messages of data 630). In several aspects, the acquired slot 646 is locked as described herein while the message is being stored in the fixed-size storage pool 640 and the concurrent pool index 642 is being updated. In a number of aspects, the acquired slot is unlocked once the storage of the message and the updating of the concurrent pool index 642 is complete as described herein.

Once stored, the processor 620 can transmit an indication that the data is available 650 as described herein. In a variety of aspects, the processor 620 transmits the indication 650 once a portion of the data 630 is stored. In many aspects, the processor 620 transmits the indication 650 once an entire sequence of ordered messages is stored. For example, when data 630 includes a set of ordered messages, each of the messages can be received in an order that differs from the ordering of the messages within the data 630. In several aspects, the indication 650 can be transmitted when one or more messages are received, but each message in the set of ordered messages has not yet been received. In a number of aspects, the indication 650 is transmitted once every message in the set of ordered messages has been received (regardless of the order in which the messages were received) such that the ordered set of messages can be retrieved from the fixed-size storage pool 640.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method, comprising:
obtaining data;
committing the obtained data to a fixed-size storage pool, the fixed-size storage pool comprising a plurality of slots and a pool index comprising a fixed-length array, by:
  acquiring a slot in the plurality of slots;
  locking the acquired slot;
  storing the obtained data in the acquired slot;
  updating the pool index for the storage pool by updating an element in the array corresponding to the acquired slot, wherein the element stores an identifier of the obtained data, wherein the identifier includes an index of a message within a set of ordered messages; and
  unlocking the acquired slot; and
transmitting an indication that the data is available.

2. The computer-implemented method of claim 1, wherein the transmitted indication causes a computing device receiving the indication to obtain a copy of the data by querying the fixed-size storage pool.

3. The computer-implemented method of claim 1, wherein the plurality of slots comprises a data structure selected from the group consisting of a stack and a queue.

4. The computer-implemented method of claim 1, wherein each slot in the plurality of slots can store data having an arbitrary size.

5. The computer-implemented method of claim 1, wherein the obtained data comprises a plurality of network packets received via a network interface card.

6. The computer-implemented method of claim 5, wherein:
each of the plurality of network packets comprises an indicator of an ordering of the plurality of network packets; and
at least one network packet of the plurality of network packets is received out of order.

7. The computer-implemented method of claim 6, wherein the indication that the data is available is generated based on a continuous subset of the plurality of network packets having been obtained.

8. An apparatus, comprising:
a processor; and
a memory in communication with the processor and storing instructions that, when executed by the processor, cause the apparatus to:
obtain data;
commit the obtained data to a fixed-size storage pool by:
acquiring a slot in the fixed-size storage pool;
locking the acquired slot;
storing the obtained data in the acquired slot;
updating a concurrent pool index for the storage pool, wherein the concurrent pool index stores an indication of the acquired slot and an identifier of the obtained data, wherein the identifier includes an index of a message within a set of ordered messages; and
unlocking the slot; and
transmit an indication that the data is available.

9. The apparatus of claim 8, wherein the pool index comprises a fixed length array.

10. The apparatus of claim 8, wherein the fixed-size storage pool comprises a data structure selected from the group consisting of a stack and a queue.

11. The apparatus of claim 8, wherein each slot in the fixed-size storage pool can store data having an arbitrary size.

12. The apparatus of claim 8, wherein the obtained data comprises a plurality of messages received from an event streaming service.

13. The apparatus of claim 12, wherein:
each of the plurality of messages comprises an indicator of an ordering of the plurality of messages; and
at least one message of the plurality of messages is received out of order.

14. The apparatus of claim 13, wherein the obtained data further comprise an indication of a timestamp.

15. A non-transitory computer readable medium storing instructions that, when executed by one or more processors, cause the one or more processors to perform steps comprising:
obtaining a plurality of messages;
committing the plurality of messages to a fixed-size storage pool by, for each message:
acquiring a slot in the fixed-size storage pool;
locking the acquired slot;
storing the message in the acquired slot;
updating a concurrent pool index for the storage pool, wherein the pool index stores an indication of the acquired slot and an identifier of the message, wherein the identifier includes an index of the message within a set of ordered messages; and
unlocking the slot; and
transmitting an indication that the plurality of messages are available.

16. The non-transitory computer readable medium of claim 15, wherein the pool index comprises a fixed length array.

17. The non-transitory computer readable medium of claim 15, wherein the fixed-size storage pool comprises a data structure selected from the group consisting of a stack and a queue.

18. The non-transitory computer readable medium of claim 15, wherein each slot in the fixed-size storage pool can store data having an arbitrary size.

19. The non-transitory computer readable medium of claim 15, wherein:
each of the plurality of messages comprises an indicator of an ordering of the plurality of messages; and
at least one message of the plurality of messages is received out of order.

20. The non-transitory computer readable medium of claim 19, wherein the plurality of messages are ordered by an offset from a root message in the plurality of messages.

* * * * *